(12) United States Patent
Hennigan et al.

(10) Patent No.: US 12,552,734 B2
(45) Date of Patent: Feb. 17, 2026

(54) PROCESS FOR PRODUCING ACETIC ACID

(71) Applicant: Ineos Acetyls UK Limited, Lyndhurst (GB)

(72) Inventors: Sean Anthony Hennigan, Hull (GB); John Peter Eric Muller, Hull (GB)

(73) Assignee: Ineos Acetyls UK Limited, Lyndhurst (GB)

( * ) Notice: Subject to any disclaimer, the term of this patent is extended or adjusted under 35 U.S.C. 154(b) by 748 days.

(21) Appl. No.: 17/916,745

(22) PCT Filed: Mar. 29, 2021

(86) PCT No.: PCT/EP2021/058199
§ 371 (c)(1),
(2) Date: Oct. 3, 2022

(87) PCT Pub. No.: WO2021/204585
PCT Pub. Date: Oct. 14, 2021

(65) Prior Publication Data
US 2023/0150908 A1    May 18, 2023

(30) Foreign Application Priority Data
Apr. 6, 2020 (GB) ..................... 2005016

(51) Int. Cl.
*C07C 53/08* (2006.01)
*B01J 19/24* (2006.01)
(Continued)

(52) U.S. Cl.
CPC ............. *C07C 53/08* (2013.01); *B01J 19/245* (2013.01); *B01J 23/46* (2013.01); *C07C 51/12* (2013.01); *B01J 2219/00051* (2013.01)

(58) Field of Classification Search
None
See application file for complete search history.

(56) References Cited

U.S. PATENT DOCUMENTS 6,211,405 B1    4/2001  Cheung et al.
10,550,059 B2 *  2/2020  Hennigan ............... C07C 51/44
(Continued)

FOREIGN PATENT DOCUMENTS

EP    0161874 A1   11/1985
EP    0728727 A1    8/1996
(Continued)

OTHER PUBLICATIONS

Search Report of UK Patent Application No. GB2005016.7, date of search Sep. 28, 2020, 1 page.
(Continued)

*Primary Examiner* — Amy C Bonaparte
(74) *Attorney, Agent, or Firm* — McDonnell Boehnen Hulbert & Berghoff LLP

(57) ABSTRACT

The present disclosure relates generally to processes and systems for production of acetic acid. In one aspect, the disclosure provides a process for producing acetic acid that includes contacting carbon monoxide and one or more of methanol and reactive derivatives thereof with a carbonylation catalyst in a first reaction zone to produce a product stream, transferring at least a portion of the product stream into a second reaction zone; at a first position between the reaction zone inlet and an outlet of the second reaction zone, introducing a first vapour stream (90-100% CO) to the second reaction zone; at a second position between the reaction zone inlet and the outlet, introducing a second vapour stream the second vapour stream comprising less than 90 wt. % carbon monoxide; and through the outlet, withdrawing an effluent of the second reaction zone.

22 Claims, 4 Drawing Sheets

(51) Int. Cl.
  *B01J 23/46*   (2006.01)
  *C07C 51/12*   (2006.01)

(56) References Cited

U.S. PATENT DOCUMENTS

2012/0078012 A1   3/2012   Torrence et al.
2019/0210952 A1   7/2019   Hennigan

FOREIGN PATENT DOCUMENTS

| | | |
|---|---|---|
| EP | 2093209 A1 | 8/2009 |
| WO | 03/106396 A1 | 5/2003 |
| WO | 03/097567 A1 | 11/2003 |
| WO | 2007/107724 A1 | 3/2007 |
| WO | 2009/103948 A1 | 8/2009 |
| WO | 2013/119275 A1 | 8/2013 |
| WO | WO-2017216024 A1 * 12/2017 ............. C07C 51/12 |

OTHER PUBLICATIONS

Written Opinion and International Search Report of International Patent Application No. PCT/EP2021/058199, mailed Jul. 1, 2021, 9 pages.

* cited by examiner

PROCESS FOR PRODUCING ACETIC ACID

This application is a U.S. national phase application of International Patent Application no. PCT/EP2021/058199 filed on Mar. 29, 2021, which claims the benefit of UK Provisional Patent Application no. 2005016.7, filed on Apr. 6, 2020, each of which is incorporated by reference in its entirety.

BACKGROUND OF THE DISCLOSURE

1. Field

The present disclosure relates generally to processes and apparatuses for production of acetic acid. In particular, the disclosure relates to processes for production of acetic acid from methanol and carbon monoxide using a carbonylation catalyst, and systems useful in performing such processes.

2. Technical Background

Commercially, acetic acid has been manufactured for many years by carbonylating methanol with carbon monoxide in the presence of a Group VIII carbonylation catalyst. Typically, carbon monoxide is contacted with methanol in the presence of a rhodium or an iridium homogeneous or heterogeneous carbonylation catalyst, methyl iodide and water in one or more reaction zones. In general, acetic acid product may be recovered by withdrawing crude acetic acid product from the reactor and separating the acetic acid product in one or more flash and/or distillation stages from the other components, such as the Group VIII metal carbonylation catalyst, methyl iodide, methyl acetate, and water.

The carbonylation reaction is often performed in two reaction zones in series, i.e., a first reaction zone and a second reaction zone. The first reaction zone is often a stirred tank reactor, while the second reaction zone is often a plug flow reactor in which effluent from the first reaction zone is conducted toward a separation zone. In the second reaction zone, entrained carbon monoxide can further react with methanol to provide more acetic acid product. Often, additional carbon monoxide is added in the second reaction zone with the goal of increasing the temperature of the effluent of the second reaction zone, e.g., by at least several degrees Celsius in excess of the temperature of the effluent of the first reaction zone. This not only provides for an increased conversion to acetic acid; it also can allow improved separation of acetic acid and other condensable components from the carbonylation catalyst n subsequent separation operations. Thus, the vapour fraction from the separation will be richer in acetic acid, allowing a higher yield thereof.

However, improvements are still desirable, especially with respect to increasing a temperature difference between the effluent of the first reaction zone and an effluent of a second reaction zone.

SUMMARY

The scope of the present disclosure is not affected to any degree by the statements within the summary.

In one aspect, the disclosure provides a process for producing acetic acid. The process includes:
contacting carbon monoxide and one or more of methanol and reactive derivatives thereof with a carbonylation catalyst in a first reaction zone to produce a product stream and an off-gas stream, the product stream comprising water, acetic acid, carbon monoxide, the carbonylation catalyst, and one or more of methanol and reactive derivatives thereof;
through a reaction zone inlet of a second reaction zone, transferring at least a portion of the product stream into the second reaction zone;
at a first position between the reaction zone inlet and an outlet of the second reaction zone, introducing a first vapour stream to the second reaction zone, the first vapour stream comprising carbon monoxide and having a carbon monoxide concentration;
at a second position between the reaction zone inlet and the outlet of the second reaction zone, introducing a second vapour stream to the second reaction zone, the second vapour stream comprising carbon monoxide and having a lower carbon monoxide concentration than the carbon monoxide concentration of the first vapour stream; and
through the outlet, withdrawing an effluent of the second reaction zone.

In another aspect, the disclosure provides a system for producing acetic acid, e.g., using the processes described herein. The system includes:
a first reaction zone having one or more inlets in communication with a source of methanol and a source of carbon monoxide, an off-gas outlet and a product stream outlet;
a second reaction zone having a reaction zone inlet and an outlet, the reaction zone inlet being in fluid communication with the product stream outlet of the first reaction zone, the second reaction zone comprising
  a first vapour stream inlet at a first position between the reaction zone inlet and the outlet, the vapour stream inlet being in communication with a source of a first vapour stream rich in carbon monoxide, and
  a second vapour stream inlet at a second position between the reaction zone inlet and the outlet, the second vapour stream inlet being in communication with a source of a second vapour stream lean in carbon monoxide.

Other aspects of the disclosure will be apparent to those skilled in the art in view of the description that follows.

DETAILED DESCRIPTION

Figure 1:
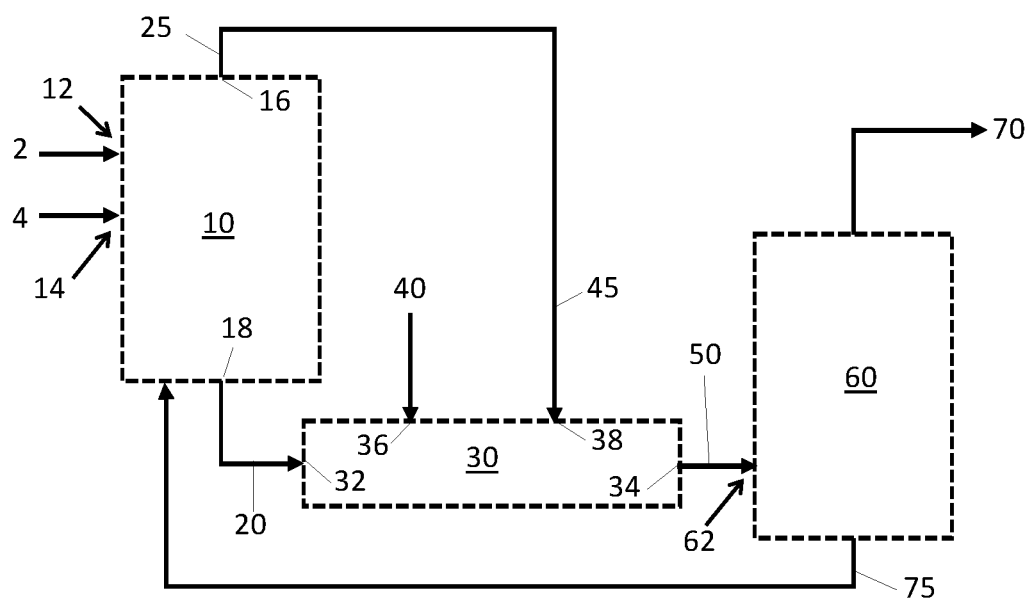
FIG. 1 shows a schematic view of a process and system for producing acetic acid according to one embodiment of the disclosure.

In various aspects, the processes of the disclosure provide for production of acetic acid by carbonylation of methanol or a reactive derivative thereof with carbon monoxide over a carbonylation catalyst. Specifically, one aspect of the disclosure is a process for producing acetic acid. The process includes:

contacting carbon monoxide and one or more of methanol and reactive derivatives thereof with a carbonylation catalyst in a first reaction zone to produce a product stream and an off-gas stream, the product stream comprising water, acetic acid, carbon monoxide, the carbonylation catalyst, and one or more of methanol and reactive derivatives thereof;

through a reaction zone inlet of a second reaction zone, transferring at least a portion of the product stream into the second reaction zone;

at a first position between the reaction zone inlet and an outlet of the second reaction zone, introducing a first vapour stream to the second reaction zone, the first vapour stream comprising carbon monoxide and having a carbon monoxide concentration (e.g., in the range of 90-100%), at a second position between the reaction zone inlet and the outlet of the second reaction zone, introducing a second vapour stream to the second reaction zone, the second vapour stream comprising carbon monoxide having a lower carbon monoxide concentration than the carbon monoxide concentration of the first vapour stream (e.g., less than 90%); and through the outlet, withdrawing an effluent of the second reaction zone.

The present inventors have noted that in conventional processes, reaction in the second reaction zone can help to react entrained and/or dissolved carbon monoxide in the effluent from the first reaction zone to improve feedstock efficiency. Carbon monoxide can not only react with methanol, but also with methyl acetate and methyl iodide, each of which can provide additional acetic acid. But carbonylation in the second reaction zone can also have another important effect: the exothermicity of the carbonylation reaction can increase the temperature to improve efficiency of flashing in the flash separation zone.

The introduction of additional carbon monoxide into the second reaction zone can further drive the carbonylation in the second reaction zone to produce more acetic acid and further increase the temperature. Increased carbonylation in the second reaction zone itself has a number of advantages over and above the increase in temperature. In particular, since additional acetic acid is produced, the vapour fraction in the flash separation zone will be even further enriched with acetic acid. Further, since methyl acetate and water may also be consumed, separation of product acetic acid from light components (which include methyl acetate and water) will require less energy than would otherwise be required. Alternatively, since methyl acetate and water can be consumed in the second reaction zone, the first reaction zone can be operated at higher concentrations of methyl acetate and water without adversely affecting the composition ultimately effluxing from the second reaction zone (e.g., into a flash separation zone). And since the formation of by-products in methanol carbonylation processes tends to decrease with increasing concentrations of methyl acetate and water, operating the first reaction zone at higher concentrations of methyl acetate and water can lead to an overall reduction in by-products.

The present inventors have noted, however, that increasing CO feed to the second reaction zone increases effluent temperature only to a certain point, after which point addition of further CO provides little further temperature increase; rather, extra CO simply passes through unreacted. Further benefit on flashing efficiency is possible if the effluent temperature is further increased, so it is desirable to further increase the temperature increase caused by carbonylation in the second reaction zone.

The inventors have determined that the reaction of CO in liquid solution to products is very slow compared to the mass transfer of CO from gas to liquid. Thus, the present inventors have noted that it is highly desirable to maintain a high liquid residence time to achieve a high overall reaction rate.

The inventors have also determined that, although CO partial pressure increases with increasing CO feed in, the volume fraction of the vapour in the second reaction zone associated with the gas flow (plus the equilibrium evapouration of lights into the vapour bubbles) also increases at the expense of the liquid value fraction. The inventors have determined that, advantageously, feeding a relatively impure CO stream (e.g., offgas from the first reaction zone, containing CO in addition to inert gases and vapourized light components) to the second reaction zone can be useful to recover carbon monoxide from the offgas. Thus, in certain desirable embodiments, the second vapour further includes water, acetic acid, and one or more of methanol and reactive derivatives thereof. This can advantageously help maintain reactive species in the liquid phase in the second reaction zone; as the carbonylation reaction is largely a liquid phase process, it is advantageous to maintain reactants in the liquid phase. A higher purity CO stream can be added to "fine-tune" the reaction in order to provide a desirably high effluent temperature and low effluent CO concentration.

Accordingly, one embodiment of the disclosure is described with respect to FIG. 1. Carbon monoxide and one or more of methanol and reactive derivatives thereof are contacted with a carbonylation catalyst in a first reaction zone. In the embodiment of FIG. 1, carbon monoxide 2 and methanol 4 are introduced to a first reaction zone 10, which can include, for example, a stirred reaction tank. The contacting produces a product stream 20 and an off-gas stream 25. The product stream 20 includes water, acetic acid, carbon monoxide, the carbonylation catalyst, and one or more of methanol and reactive derivatives thereof. At least a portion of the product stream is conducted into a second reaction zone through a reaction zone inlet thereof. The second reaction zone desirably includes a flow reactor, i.e., in which material reacts as it is conducted from an inlet to an outlet thereof. The flow reactor can be, for example, a plug flow reactor, e.g., in the shape of a pipe. In the embodiment of FIG. 1, the product stream 20 is conducted to the second reaction zone 30 through reaction zone inlet 32. At a first position between the reaction zone inlet and an outlet of the second reaction zone, a first vapour stream is introduced to the second reaction zone. This first vapour stream includes carbon monoxide. And at a second position between the reaction zone inlet and the outlet of the second reaction zone, a second vapour stream is introduced to the second reaction zone. This second vapour stream also includes carbon monoxide, at a concentration that is less than the concentration of carbon monoxide in the first vapour stream, In the embodiment of FIG. 1, a first vapour stream 40 is introduced into the second reaction zone 30 at a first position 36 between reaction zone inlet 32 and outlet 34, and a second vapour stream 45 is introduced into the second reaction zone 30 at a second position 38 between reaction zone inlet 32 and outlet 34. Through the outlet 34, an effluent 50 of the second reaction zone is withdrawn. As described above, the present inventors have noted that use of two different vapour streams to introduce carbon monoxide to the second reaction zone can result in a number of advantages. Use of a first, relatively high CO concentration, vapour stream and a second, relatively impure, vapour stream can advantageously allow the person of ordinary skill in the art to tune the effluent temperature and CO concentration.

Moreover, the present inventors have determined that the order in which the first vapour stream and the second vapour stream are introduced to the second reaction zone can have an important effect on carbonylation efficiency. The present inventors have determined, as described in the Examples below, that introduction of the first vapour stream upstream of the second vapour stream can provide a greater conversion of CO than introduction in the opposite order. This is true regardless of whether the second vapour stream is added close to the reaction zone inlet of the second reaction zone, close to the outlet of the second reaction zone, or at an intermediate position between them.

Accordingly, in certain embodiments as otherwise described herein, the first position (i.e., where the first, relatively higher CO concentration, vapour stream is introduced to the second reaction zone) is between the reaction zone inlet and the second position (i.e. where the second, relatively lower CO concentration, vapour stream is introduced to the second reaction zone). As noted above, this arrangement can provide increased CO efficiency than other arrangements.

In certain embodiments as otherwise described herein, the distance between the reaction zone inlet and the first position is no more than 25% of a distance between the reaction zone inlet and the outlet of the second reaction zone. For example, in certain embodiments, the distance between the reaction zone inlet and the first position is no more than 15%, or even no more than 10%, of a distance between the reaction zone inlet and the outlet of the second reaction zone.

In certain embodiments as otherwise described herein, the distance between the reaction zone inlet and the second position is at least 50% of a distance between the reaction zone inlet and the outlet of the second reaction zone. For example, in certain embodiments, the distance between the reaction zone inlet and the second position is at least 60%, or even at least 10%, of a distance between the reaction zone inlet and the outlet of the second reaction zone.

Based on the disclosure herein, the person of ordinary skill in the art can select the relative positioning of the first position and the second position along with flow rates and concentrations of the first and second vapour streams to provide a desired high effluent temperature and a desired low effluent CO concentration.

In the processes described herein, methanol and/or reactive derivatives thereof can be introduced into the first reaction zone as liquid reactants (i.e., to form a liquid reaction composition in the first reaction zone). For example, in certain desirable embodiments of the processes as otherwise described herein, methanol is introduced into the first reaction zone as a reactant. In other processes as otherwise described herein, one or more reactive derivatives are introduced into the first reaction zone as a reactant, or a combination of methanol together with one or more reactive derivatives of methanol are introduced into the first reaction zone as reactants. As used herein, "reactive derivatives" of methanol are methyl acetate, dimethyl ether and methyl iodide. In certain embodiments as otherwise described herein, methanol and/or methyl acetate are used as liquid reactants. In one embodiment as otherwise described herein, methanol is used as a reactant; in another embodiment as otherwise described herein, methyl acetate is used as a reactant; and in yet another embodiment as otherwise described herein, a mixture of methanol and methyl acetate is used as reactants.

The processes described herein can employ a variety of carbonylation catalysts, e.g., a group VIII noble metal carbonylation catalyst. The catalyst can include a group VIII species supported on an inert support, e.g., a carbon support. In certain desirable embodiments as otherwise described herein, the carbonylation catalyst comprises rhodium, iridium or mixtures thereof. In one particular embodiment of the present invention, the carbonylation catalyst is iridium. In another particular embodiment as otherwise described herein, the carbonylation catalyst is a rhodium catalyst. A catalyst promoter may optionally be present, for example, selected from alkali metal iodides (e.g., lithium iodide), alkaline earth metal iodides, aluminum group metal iodides, organic iodide salts, ruthenium, osmium, rhenium, and mixtures thereof. Where the catalyst is a rhodium catalyst, the optional carbonylation catalyst promoter may desirably be selected from the alkali metal iodides, for example lithium iodide, alkaline earth metal iodides, aluminum group metal iodides and/or organic iodide salts, and mixtures thereof. Where the catalyst is an iridium catalyst, the optional carbonylation catalyst promoter may desirably be selected from the group consisting of ruthenium, osmium, rhenium, and mixtures thereof.

Where the carbonylation catalyst is an iridium catalyst, the iridium catalyst can include any iridium-containing compound that is substantially soluble in the liquid reaction composition. The iridium catalyst can be added to the liquid reaction composition in any suitable form that substantially dissolves in the liquid reaction composition or is convertible to a soluble form. The iridium catalyst is desirably used as a chloride free compound, e.g., an acetate, soluble in one or more of the liquid reaction composition components (e.g., water and/or acetic acid) and so may be added to the reaction as solutions therein. Examples of suitable iridium-containing compounds which can be added to the liquid reaction composition include $IrCl_3$, $IrI_3$, $IrBr_3$, $[Ir(CO)_2I]_2$, $[Ir(CO)_2Cl]_2$, $[Ir(CO)_2Br]_2$, $[Ir(CO)_4I_2]^-H^+$, $[Ir(CO)_2Br_2]^-H^+$, $[Ir(CO)_2I_2]^-H^+$, $[Ir(CH_3)I_3(CO)_2]^-H^+$, $Ir_4(CO)_{12}$, $IrCl_3.4H_2O$, $IrBr_3.4H_2O$, $Ir_3(CO)_{12}$, iridium metal, $Ir_2O_3$, $IrO_2$, $Ir(acac)(CO)_2$, $Ir(acac)_3$, iridium acetate, $[Ir_3O(OAc)_6(H_2O)_3][OAc]$, and hexachloroiridic acid $H_2[IrCl_6]$, desirably chloride-free complexes of iridium such as acetates, oxalates and acetoacetates.

When present, the concentration of the iridium catalyst in a liquid reaction composition in the first and second reaction zones can be, e.g., independently in the range 100 to 6000 ppm by weight of iridium.

When the carbonylation catalyst is an iridium catalyst, the carbonylation catalyst promoter is desirably ruthenium. The promoter can include any ruthenium-containing compound that is substantially soluble in the liquid reaction composition. The ruthenium promoter can be added to the liquid reaction composition in any suitable form that substantially dissolves in the liquid reaction composition or is convertible to soluble form. The ruthenium promoter compound is desirably used as a chloride free compound, e.g., an acetate, soluble in one or more of the liquid reaction composition components (e.g., water and/or acetic acid) and so may be added to the reaction as solutions therein.

Examples of suitable ruthenium-containing compounds which may be used include ruthenium (III) chloride, ruthenium (III) chloride trihydrate, ruthenium (IV) chloride, ruthenium (III) bromide, ruthenium (III) iodide, ruthenium metal, ruthenium oxides, ruthenium (III) formate, [Ru(CO)

$_3I_3]^-H^+$, tetra(aceto)chlororuthenium (II, III), ruthenium (III) acetate, ruthenium (III) propionate, ruthenium(III) butyrate, ruthenium pentacarbonyl, trirutheniumdodecacarbonyl and mixed ruthenium halocarbonyls such as dichlorotricarbonylruthenium (II) dimer, dibromotricarbonylruthenium (II) dimer, and other organoruthenium complexes such as tetrachlorobis(4-cymene)diruthenium (II), tetrachlorobis (benzene)diruthenium(II), dichloro(cycloocta-1,5-diene)ruthenium (II) polymer and tris(acetylacetonate)ruthenium (III). Desirably, the ruthenium-containing compounds are free of impurities which provide or generate in-situ ionic iodides which may inhibit the reaction, for example, alkali or alkaline earth metal or other metal salts.

The ruthenium promoter can be present in any effective amount up to the limit of its solubility in the liquid reaction composition, the liquid fraction and/or any liquid process streams recycled to the carbonylation reaction zones. For example, the ruthenium promoter is suitably present in the liquid reaction composition at a molar ratio of each ruthenium promoter: Iridium in the range [0.1 to 100]:1, preferably [greater than 0.5]:1, more preferably [greater than1]:1 and preferably [up to 20]:1 more preferably [up to 15]:1 and yet more preferably [up to10]:1. The concentration of ruthenium promoter in the liquid reaction composition in each of the first and second reaction zones is typically, independently, less than 6000 ppm. Suitable promoter concentrations range from, for example, 400 to 5000 ppm, such as 2000 to 4000 ppm.

Suitable rhodium carbonylation catalysts are described, for example, in EP-A-0 161 874, U.S. Pat. No. 6,211,405 and EP-A-0728727, each of which is hereby incorporated herein by reference in its entirety. Where the carbonylation catalyst is a rhodium catalyst, the rhodium catalyst concentration in the liquid reaction composition is preferably in the range 50 to 5000 ppm, preferably 100 to 1500 ppm by weight of rhodium. Where rhodium is used as the catalyst, an alkali metal iodide, such as lithium iodide is preferably used as the promoter, as described, for example, in the references cited above.

Thus, in certain embodiments, homogeneous carbonylation of methanol and/or a reactive derivative thereof by carbon monoxide is catalyzed by a soluble Group VIII metal carbonylation catalyst (e.g., comprising rhodium and/or iridium) in a liquid reaction composition including the methanol and/or the reactive derivative thereof. In certain embodiments, the liquid reaction composition includes water and one or more of methyl iodide and methyl acetate. In certain such embodiments, the liquid reaction composition further comprises propionic acid by-product.

As described above, water can be present in the liquid reaction composition. The person of ordinary skill in the art will appreciate that water is formed in situ in the liquid reaction composition by an esterification reaction between methanol and/or a reactive derivative thereof and acetic acid product. In certain embodiments, water can also be introduced to the first reaction zone (e.g., together with, or separately from other components of the liquid reaction composition). In certain desirable embodiments, water is present in the liquid reaction composition in an amount within the range of 0.1 wt. % to 15 wt. %, e.g., within the range of 1 wt. % to 15 wt. %, or within the range of 1 wt. % to 8 wt. %.

Methyl acetate may be formed in situ in the liquid reaction composition by the reaction of methanol and/or reactive derivative thereof with the acetic acid product or solvent. In certain embodiments as otherwise described herein the concentration of methyl acetate in the liquid reaction composition in the first reaction zone is in the range of 2 wt. % to 50 wt. %, for example, 3 wt. % to 35 wt. %.

As described above, propionic acid by-product can also be present in the liquid reaction composition. In certain embodiments, propionic acid is present in the liquid reaction composition in an amount within the range of 200 ppmw to 2,500 ppmw, e.g., within the range of 400 ppmw to 2,000 ppmw, or within the range of 600 ppmw to 1,400 ppmw.

In certain desirable embodiments, methyl iodide is present in the liquid reaction composition in an amount within the range of 1 wt. % to 20 wt. %. For example, in certain such embodiments, methyl iodide is present in the liquid reaction composition in an amount within the range of 2 wt. % to 16 wt. %.

In certain embodiments as otherwise described herein, the liquid reaction composition comprises a solvent. For example, in certain such embodiments, the liquid reaction composition comprises an acetic acid solvent (e.g., recycled from a separation zone of the acetic acid production unit).

As described above, acetic acid can be produced in the reaction zone by carbonylation of methanol and/or a reactive derivative thereof with carbon monoxide. In certain embodiments as otherwise described herein, the carbon monoxide provided to the first reaction zone is essentially pure. In other embodiments, the carbon monoxide provided to the first reaction zone contains one or more impurities such as, for example, carbon dioxide, methane, nitrogen, hydrogen, or noble gases. In certain embodiments as otherwise described herein, the partial pressure of carbon monoxide (e.g., in a reactor of the first reaction zone) is within the range of 1 bar to 70 bar, e.g., within the range of 1 bar to 35 bar.

In certain embodiments as otherwise described herein, the carbonylation reaction in the first reaction zone is conducted at a total pressure (e.g., in a reactor of the reaction zone) within the range of 10 barg to 100 barg.

The present inventors have noted that temperatures in the first reaction zone and the second reaction zone can have an important effect on product yield and overall process efficiency. In certain embodiments as otherwise described herein, the carbonylation reaction is conducted in the first reaction zone at a temperature (e.g., in a reactor of the first reaction zone) within the range of 170-215° C. (e.g., 170-210° C., or 170-205° C., or 170-200° C., or 170-19° C., or 170-190° C., or 175-215° C., or 175-210° C., or 175-205° C., 175-200° C., or 175-195° C., or 175-190° C., or 180-215° C., or 180-210° C., or 180-205° C., 180-200° C., or 180-195° C., or 180-190° C., or 185-215° C., or 185-210° C., or 185-205° C., 185-200° C., or 185-195° C.).

As described above, at least a portion of a product stream from the first reaction zone (e.g., made up of the liquid reaction mixture) is conducted into a second reaction zone through a reaction zone inlet thereof. This can be at about the same temperature as the liquid reaction composition in the first reaction zone. In certain desirable embodiments as otherwise described herein, the temperature of the product stream at the reaction zone inlet of the second reaction zone is in the range of 170-215° C. (e.g., 170-210° C., or 170-205° C., or 170-200° C., or 170-195° C., or 170-190° C., or 175-215° C, or 175-210° C., or 175-205° C., 175-200° C., or 175-195° C., or 175-190° C. or 180-215° C., or 180-210° C., or 180-205° C., 180-200° C., or 180-195° C., or 180-190° C., or 185-215° C., or 185-210° C., or 185-205° C., 185-200° C., or 185-195° C.).

Notably, the provision of carbon monoxide in the second reaction zone can provide further reaction, raising the temperature of the liquid reaction composition therein. In certain embodiments as otherwise described herein, the temperature of the effluent at the outlet of the second reaction zone is in the range of 175-215° C. (e.g., 175-210° C., or 175-205° C., 175-200° C., or 175-195° C., or 175-190° C., or 180-215° C., or 180-210° C., or 180-205° C., 180-200° C., or 180-195° C., or 180-190° C., or 185-215° C., or 185-210° C., or 185-205° C., 185-200° C., or 185-195° C.). Providing an effluent at a high temperature can assist with efficiency of separation in subsequent separation operations.

In certain desirable embodiments, the temperature of the effluent at the outlet of the second reaction zone is at least 3° C. greater than a temperature of the product stream at the reaction zone inlet of the second reaction zone. For example, in certain embodiments, the temperature of the effluent at the outlet of the second reaction zone is at least 5° C. greater, or at least 7° C. greater than the temperature of the product stream at the reaction zone inlet of the second reaction zone. In certain such embodiments, the temperature of the effluent at the outlet of the second reaction zone is no more than 40° C. greater than (e.g., no more than 35° C. greater than, or no more than 30° C. greater than, or no more than 25° C. greater than the temperature of the product stream at the reaction zone inlet of the second reaction zone. For example, in certain embodiments as otherwise described herein, the temperature of the effluent at the outlet of the second reaction zone is no more than 20° C. greater than (e.g., no more than 18° C. greater than, or no more than 15° C. greater than) the temperature of the product stream at the reaction zone inlet of the second reaction zone.

This increase in temperature can allow improved separation of acetic acid and other condensable components from the carbonylation catalyst and optional carbonylation catalyst promoter in a flash separation zone. Thus, the vapour fraction from the flash separation zone will be richer in acetic acid, thereby allowing a higher yield of acetic acid to be achieved. Further, the volume and flow rate of the liquid fraction will be reduced.

At least part of the increase in temperature, and desirably substantially all of the increase in temperature, between the product composition of the first reaction zone and the effluent of the second reaction zone is provided by the reaction of carbon monoxide in the second reaction zone (i.e., the carbon monoxide of the first and second vapour streams and any carbon monoxide dissolved and/or entrained in the product composition provided from the first reaction zone). Heat can optionally be applied to the second reaction zone to further increase the temperature rise of the liquid reaction composition. Thus, in one embodiment as otherwise described herein, heat is applied to the second reaction zone. However, in certain desirable embodiments, no heat is applied to the second reaction zone and substantially all of the increase in temperature in the second reaction zone is provided by reaction of carbon monoxide therein.

The person of ordinary skill in the art can, based on the disclosure herein, determine flows of the first vapour stream and the second vapour stream to provide a desired temperature increase. For example, in certain embodiments as otherwise described herein, the weight ratio of an amount of the first vapour stream introduced at the first position to an amount of the product stream conducted to the second reaction zone is no more than 1:5, e.g., 1:1000 to 1:5, or 1:750 to 1:5, or 1:500 to 1:5, or 1:200 to 1:5. Similarly, in certain embodiments as otherwise described herein, the weight ratio of an amount of the second vapour stream introduced at the second position to an amount of the product stream conducted to the second reaction zone is 1:200 to 1:5. In certain embodiments as otherwise described herein, the weight ratio of an amount of the first vapour stream introduced at the first position to an amount of the second vapour stream introduced at the second position is 5:1 to 1:5. Of course, the person of ordinary skill in the art will appreciate that in some cases the various amounts can deviate from these general ranges.

The first vapour stream has a higher carbon monoxide concentration than the second vapour stream. For example, in certain embodiments as otherwise described herein, the first vapour stream is rich in carbon monoxide, e.g., having at least 70 wt. %, or even at least 80 wt.% carbon monoxide. For example, in certain such embodiments, the first vapour stream includes at least 90 wt. % carbon monoxide (e.g., at least 95 wt. %, or at least 98 wt. %, or at least 99 wt. %) carbon monoxide. A variety of sources of carbon monoxide can be used to provide carbon monoxide of the desired purity, including the same source used to introduce carbon monoxide to the first reaction zone.

The second vapour stream has a lower carbon monoxide concentration than the first vapour stream. Accordingly, it can be relatively poor in carbon monoxide, e.g., 10-70 wt. % carbon monoxide. In certain embodiments as otherwise described herein, the second vapour stream includes 10-60 wt. %, or 10-50 wt. %, or 10-40 wt. %, or 10-30 wt. %, or 20-70 wt. %, or 20-60 wt. %, or 20-50 wt. %, or 30-70 wt. %, or 30-60 wt. % carbon monoxide. For example, in certain embodiments, the second vapour stream includes water, acetic acid, and one or more of methanol and reactive derivatives thereof. Advantageously, the second vapour stream can be provided by a vapour process stream from another part of the process or even from a different process. In certain embodiments, the second vapour stream includes at least a portion of the off-gas stream of the first reaction zone and includes carbon monoxide, water, and acetic acid. In certain embodiments, at least 50 wt. %, at least 75 wt. %, or even at least 90 wt. % of the second vapour stream can be provided by the off-gas stream of the first reaction zone.

The carbon monoxide concentrations of the first and second vapour streams can be selected based on the disclosure herein. For example, in certain embodiments, the carbon monoxide concentration of the first vapour stream is at least 5 wt. % (e.g., at least 10 wt. %, at least 15 wt. %) higher than the carbon monoxide concentration of the second vapour streams. In certain embodiments as otherwise described herein, the carbon monoxide concentration of the first vapour stream is at least 20 wt. %, or at least 25 wt. %) higher than the carbon monoxide concentration of the second vapour stream.

The effluent of the second reaction zone comprises water and acetic acid, In certain embodiments as otherwise described herein, the effluent of the second reaction zone includes 70-95 wt. % (e.g., 70-90 wt. %, or 75-95 wt. %) acetic acid. It can be desirable for the carbon monoxide to be substantially reacted in the first and second reaction zones; in certain desirable embodiments as otherwise described herein, the effluent of the second reaction zone includes no more than 2 wt. % (e.g., no more than 1 wt. %, or even no more than 0.5 wt. %) carbon monoxide. However, it can be desirable to have some amount of CO remaining in the effluent, in order to reduce the amount of solids deposits. For example, in certain embodiments, the effluent includes at least 0.1 wt. % carbon monoxide. The person of ordinary skill in the art will select an effluent CO concentration for the particular system and process at hand, and will appreciate that the amount of carbon monoxide remaining in the effluent will depend, e.g., on the amounts of carbon monoxide in the first and second vapour streams and the rate at which that carbon monoxide is reacted in the second reaction zone. Thus, a variety of other effluent carbon monoxide concentrations are possible.

In certain embodiments as otherwise described herein, the effluent of the second reaction zone further comprises one or more of methyl iodide, methyl acetate, and a Group VII metal carbonylation catalyst. For example, in certain such embodiments, the effluent of the second reaction zone includes 5-95 wt. % acetic acid (e.g., 70-95 wt. %, or 70-90 wt. %, or 75-95 wt. %), 0.1-70 wt. % (e.g., 0.1-25 wt. %, or 0.1-20 wt. %) methyl acetate, 0.1-15 wt. % water, 10-6,000 ppmw Group VIII metal carbonylation catalyst, up to 20 wt. % (e.g., 1-20 wt. %) methyl iodide, and 200-2,500 ppmw propionic acid.

The effluent of the second reaction zone can be conducted to a flash separation zone (e.g., by a flashing valve 62), where it is separated into a vapour stream rich in acetic acid and a liquid stream lean in acetic acid. The liquid stream can be introduced (i.e. as recycle) to the first reaction zone. For example, referring to FIG. 1, the effluent 50 is conducted to a flash separation zone 60 to form a vapour fraction 70 and a liquid fraction 75. At least a portion of the liquid fraction 75 can be introduced to the first reaction zone 10.

Flash separation zones are known in the art. The flash separation zone can in certain embodiments include an adiabatic flash vessel. Alternatively or additionally, the flash separation zone can be heated, e.g., by a heater. The flash separation zone can typically be operated at a pressure in the range of 0 to 10 barg, preferably 0 to 3 barg.

As described above, unproved separation in the flash separation zone can result in reduced volume and flow rate of the liquid fraction. Thus, where at least a portion of the liquid fraction is recycled to the first reaction zone, the reduced flow rate of the liquid fraction can result in decreased cooling in the first reaction zone, reducing the energy requirements of the process. Moreover, since the flow rate of the liquid fraction is reduced the flow rates of the liquid reaction composition passing from the first reaction zone to the second reaction zone and the liquid reaction composition passing from the second reaction zone to the flash separation zone can also be reduced. As a result, the amount of carbonylation catalyst and optional carbonylation catalyst promoter passed to the flash separation zone per unit of time can be reduced; and, as the vapour fraction is enriched in acetic acid, the amount of catalyst and optional promoter passed to the flash separation zone per unit of acetic acid produced can also be reduced.

The carbonylation process as described herein can be conducted as a batch process or as a continuous process. In certain desirable embodiments, the carbonylation process is conducted as a continuous process.

In certain embodiments, at least a portion of the vapour fraction of the flash separation zone is conducted to a light ends recovery zone of the acetic acid production unit. In certain embodiments, the light ends recovery zone of the acetic acid production unit is configured to separate at least the components (e.g., of the vapour fraction withdrawn from the tank, as otherwise described herein) that are more volatile than acetic acid, from acetic acid. For example, in certain embodiments, acetic acid is produced in the reaction zone by carbonylation of methanol and/or a reactive derivative thereof with carbon monoxide in the presence of a Group VIII metal catalyst system, and the light ends recovery zone of the acetic acid production unit is configured to separate acetic acid and to further separate methyl iodide and methyl acetate, which can be recycled to the reaction zone.

In certain embodiments as otherwise described herein, the light ends recovery zone comprises a distillation column that separates crude acetic acid product comprising acetic acid and propionic acid from a light ends fraction including methyl iodide and methyl acetate. In certain such embodiments, the light ends recovery zone further comprises a drying column. For example, in certain embodiments as otherwise described herein, the light ends recovery zone comprises a combined light ends and drying column, in which water is removed from crude acetic acid product to form a dry acetic acid product comprising acetic acid and propionic acid. As used herein, a "dry" or "dried" stream comprising acetic acid (e.g., and optionally propionic acid) comprises water in an amount of at most 1,500 ppmw.

Suitable columns which may be employed in the light ends recovery zone, and configurations thereof, are generally known in the art. Typically, at least a first fraction comprising acetic acid and propionic acid, and an overhead vapour fraction comprising methyl acetate, water, acetic acid, carbon monoxide, and methyl iodide are formed in the light ends recovery zone. In certain embodiments, the separated water can be recycled to the reaction zone, or removed from the acetic acid production unit.

In certain embodiments as otherwise described herein, the light ends recovery zone further comprises one or more condensers and/or coolers to condense the overhead vapour fraction and form a liquid fraction. The person of ordinary skill in the art will appreciate that any suitable method known in the art to condense the overhead vapour fraction to the liquid phase can be employed. For example, in certain embodiments, the fraction is condensed using at least one heat exchanger (e.g., supplied with water as cooling medium). Components of the overhead fraction that are not condensed (e.g., carbon monoxide, carbon dioxide, inert gases, reaction by-product gases) are removed from the light ends recovery zone as an off-gas stream. In certain embodiments, acetic acid is produced in the reaction zone by carbonylation of methanol and/or a reactive derivative thereof with carbon monoxide in the presence of a Group VIII metal catalyst system, and the off-gas stream removed from the light ends recovery zone further comprises methyl iodide (e.g., present as entrained and/or evapourated methyl iodide), methyl acetate, and water.

In certain embodiments, the liquid fraction formed in the light ends recovery zone comprises methyl acetate, water, and acetic acid. In certain embodiments, acetic acid is produced in the reaction zone by carbonylation of methanol and/or a reactive derivative thereof with carbon monoxide in the presence of a Group VIII metal catalyst system, and the liquid fraction further comprises methyl iodide. In certain embodiments, the liquid fraction further comprises entrained or dissolved gaseous components (e.g., carbon monoxide, carbon dioxide, inert gases).

In certain embodiments as otherwise described herein, the light ends recovery zone comprises a decanter, in which the liquid fraction is separated into two layers: a lower (e.g., organic) layer comprising methyl acetate and an upper (e.g., aqueous) layer comprising water. In certain embodiments, acetic acid is produced in the reaction zone by carbonylation of methanol and/or a reactive derivative thereof with carbon monoxide in the presence of a Group VIII metal catalyst system, and the lower layer further comprises methyl iodide. In certain embodiments, at least a portion (e.g., all) of the upper layer from the decanter is returned to a distillation column of the light ends recovery zone, as a reflux stream. In certain embodiments, at least a portion (e.g., all) of the upper layer from the decanter is recycled to the reaction zone. In certain embodiments, off-gas is withdrawn from the decanter and transferred to an off-gas scrubbing unit (e.g., before disposal).

In certain embodiments, a stream comprising acetic acid and propionic acid from the light ends recovery section (e.g., the first fraction formed in the light ends recovery section) is transferred to a heavy ends column through a feed inlet positioned at an intermediate point in the column. In such embodiments, a stream comprising propionic acid is withdrawn from the heavy ends column through a heavy product outlet, and acetic acid is removed as a product stream at one or more outlets of the column (e.g., as an overhead stream from an outlet at the top of the column, as a sidedraw stream from an outlet positioned higher than the feed inlet). In certain embodiments, the product stream comprises essentially acetic acid, and comprises less than 400 ppmw, or less than 300 ppmw, or less than 250 ppmw of propionic acid. In certain embodiments, the product stream comprises essentially acetic acid, and comprises less than 1,500 ppmw of water. In certain desirable embodiments, the product stream comprises essentially acetic acid, and comprises less than 1,500 ppmw of a combined total of propionic acid and water. Suitable columns which may be employed as a heavy ends column, and configurations thereof, are generally known in the art. For example, in certain embodiments, the heavy ends column is connected to a condenser. In another example, in certain embodiments, a reboiler is connected to the base of the heavy ends column.

Another aspect of the disclosure is a system for producing acetic acid, e.g., using the processes described herein, One embodiment of the system is described with respect to FIG. 1. The system includes a first reaction zone 10 having one or more inlets 12 and 14, respectively in communication with a source of carbon monoxide 2 and a source of methanol 4, an off-gas outlet 16 and a product stream outlet 18; a second reaction zone 30 having a reaction zone inlet 32 and an outlet 34, the reaction zone inlet being in fluid communication with the product stream outlet 18 of the first reaction zone, the second reaction zone comprising a first vapour stream inlet at a first position 36 between the reaction zone inlet and the outlet, the vapour stream inlet being in communication with a source of a first vapour stream 40 rich in carbon monoxide, and a second vapour stream inlet at a second position 38 between the reaction zone inlet and the outlet, the second vapour stream inlet being in communication with a source of a second vapour stream 45 lean in carbon monoxide.

The system of this aspect of the disclosure can be substantially as described above with respect to the methods of the disclosure. For example, in certain embodiments as otherwise described herein, the first position is between the reaction zone inlet and the second position. In certain embodiments as otherwise described herein, the distance between the reaction zone inlet and the second position is at least 50% (e.g., at least 60%, or at least 70%) of a distance between the reaction zone inlet and the outlet of the second reaction zone. In certain embodiments as otherwise described herein, the distance between the inlet and the first position is no more than 25% (e.g., no more than 15%, or no more than 10%) of a distance between the reaction zone inlet and the outlet of the reaction zone.

In the following examples the production of acetic acid by carbonylating methanol with carbon monoxide in the presence of an iridium catalyst and ruthenium promoter, using the system analogous to that of FIG. 1 (although with different positions of introduction of the first vapour stream and the second vapour stream) was simulated using a rigorous kinetically driven ASPEN PLUS (Trademark) (version 7.3) computer model. In the simulation, the first reaction zone comprised a primary carbonylation tank reactor, the second reaction zone comprised a secondary plug-flow reactor, having a reduced volume compared to the primary carbonylation stirred tank reactor, the volume being such that the residence time of the second reaction zone (based on liquid only feed to the secondary reaction zone) is maintained at a predetermined residence time, and the flash separation zone comprised an adiabatic flash vessel. The liquid reaction composition in the primary reactor was 2 wt. % catalyst plus promoter (modeled as inert heavies), 4 wt. % water, 7 wt. % methyl iodide and 10 wt. % methyl acetate. The operating pressure of the primary reactor was $3 \times 10^5$ $Nm^{-2}$, and the temperature of the primary reactor was maintained at approximately 189° C., Carbon monoxide was modeled as being supplied to the primary reactor via a sparge at the bottom. The adiabatic flash vessel was operated at a pressure of $2.38 \times 10^5$ $Nm^{-2}$. A high pressure off-gas was purged from the head of the primary reactor. The model includes a kinetic expression to provide a reaction rate depending on the CO composition. For example, an initial reaction rate at the first increment of the first part of the second reaction zone set up when pure CO is used provides a reaction rate ~24 mol/l/hr based on total available volume, under the conditions of this simulated process.

Using the above-described parameters, a series of simulations were performed to establish the CO conversion (as kg/hr production of acetic acid product) vs. pure CO dosed as the first vapour stream, with a fixed flow of impure CO (about 30 mol % CO, the remainder being a mixture of condensibles and incondensibles typical of a high pressure offgas stream) as the second vapour stream and a variable flow of pure CO as the first vapour stream (to reflect practical operation). The graphs of FIGS. 2-4 demonstrate the relationship between flow of pure CO and acetic acid production as a ratio to production using only the second vapour stream (i.e., no additional pure CO introduced.)

Figure 2:
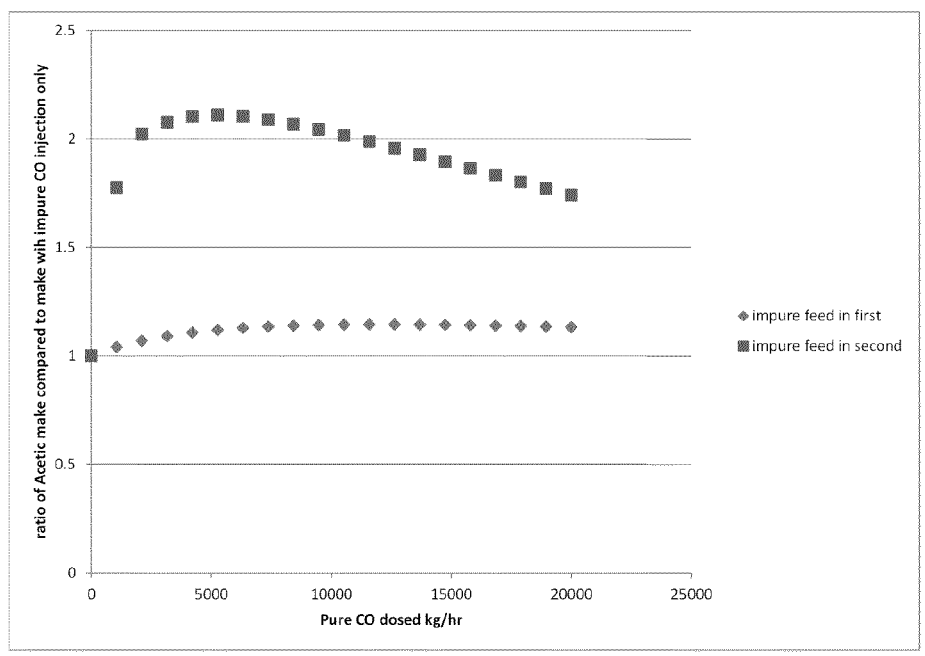
FIG. 2 is a graph showing the relationship between flow of pure CO and acetic acid production (as a ratio to production using only the second vapour stream) for a process described herein.
Figure 3:
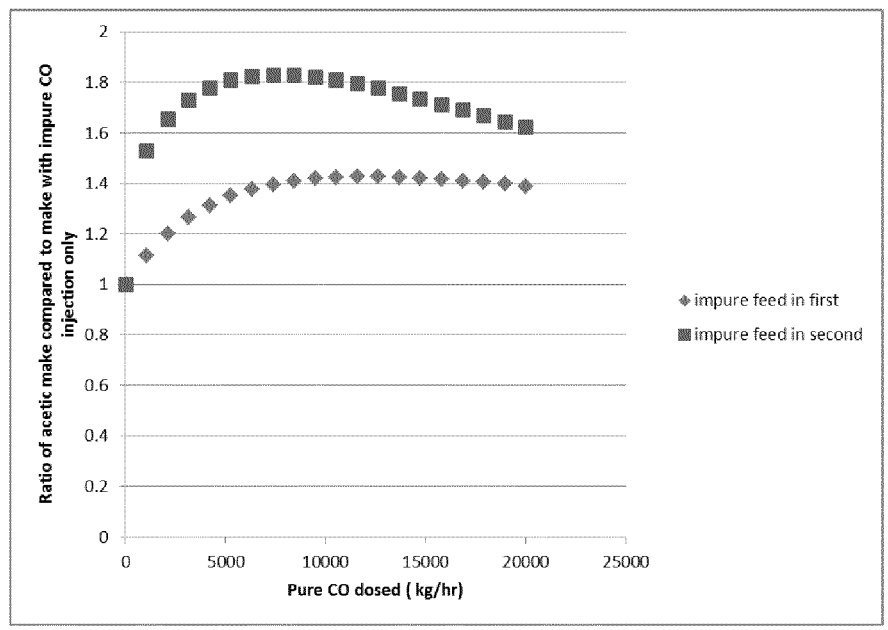
FIG. 3 is a graph showing the relationship between flow of pure CO and acetic acid production (as a ratio to production using only the second vapour stream) for a process described herein.
Figure 4:
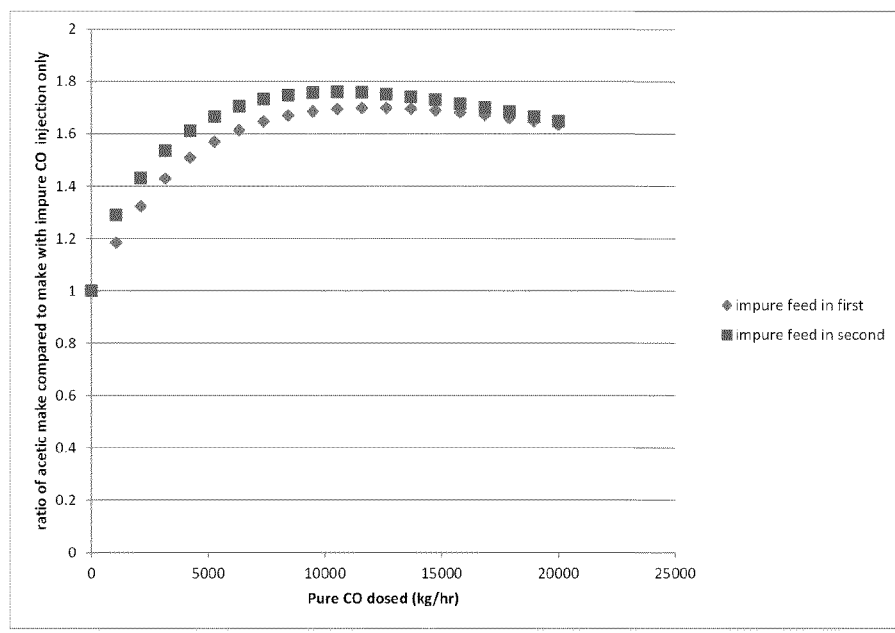
FIG. 4 is a graph showing the relationship between flow of pure CO and acetic acid production (as a ratio to production using only the second vapour stream) for a process described herein.

FIG. 2 demonstrates the effect of one vapour stream being introduced at the feed and the other vapour stream being introduced at 83% along reactor length from main feed (i.e., towards the outlet of the second reaction zone), with one set of data for the first vapour stream being introduced at the feed and the second vapour stream being introduced at the 83% point; and one point for the opposite configuration. Data are plotted as a function of dose of the first vapour stream. FIG. 3 is similar to FIG. 2, but with one vapour stream introduced at a 50% position along the second reaction zone length. And FIG. 4 is similar, but with one vapour stream introduced at a 17% position along the second reaction zone length (i.e., toward the inlet of the second reaction zone). For all the above examples the impure CO contains approx. 30 mol % CO, the remainder being a mixture of condensables and incondensables typical of a high pressure offgas stream. In all cases, the modelling demonstrates that adding impure CO second produces relatively higher yield of acetic acid, and that introducing the more pure CO first vapour stream at an earlier point in the second reaction zone provides better results.

The entire contents of each and every patent and non-patent publication cited herein are hereby incorporated by reference, except that in the event of any inconsistent disclosure or definition from the present specification, the disclosure or definition herein shall be deemed to prevail.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A process for producing acetic acid, comprising
contacting carbon monoxide and one or more of methanol and reactive derivatives thereof with a carbonylation catalyst in a first reaction zone to produce a product stream and an off-gas stream, the product stream comprising water, acetic acid, carbon monoxide, the carbonylation catalyst, and one or more of methanol and reactive derivatives thereof;
through a reaction zone inlet of a second reaction zone, transferring at least a portion of the product stream into the second reaction zone;
at a first position between the reaction zone inlet and an outlet of the second reaction zone, introducing a first vapour stream to the second reaction zone, the first vapour stream comprising carbon monoxide and having a carbon monoxide concentration;
at a second position between the reaction zone inlet and the outlet of the second reaction zone, introducing a second vapour stream to the second reaction zone, the second vapour stream comprising carbon monoxide and having a lower carbon monoxide concentration than the carbon monoxide concentration of the first vapour stream; and
through the outlet, withdrawing an effluent of the second reaction zone;
wherein the first position is between the reaction zone inlet and the second position.

2. The process of claim 1, wherein the distance between the reaction zone inlet and the second position is at least 50% of a distance between the reaction zone inlet and the outlet of the second reaction zone.

3. The process of claim 1, wherein the distance between the reaction zone inlet and the first position is no more than 25% of a distance between the reaction zone inlet and the outlet of the second reaction zone.

4. The process of claim 1, wherein a temperature of the product stream at the reaction zone inlet of the second reaction zone is in the range of 170-215° C.

5. The process of claim 1, wherein a temperature of the effluent at the outlet of the second reaction zone is in the range of 175-215° C.

6. The process of claim 1, wherein a temperature of the effluent at the outlet of the second reaction zone is at least 3° C. greater than a temperature of the product stream at the reaction zone inlet of the second reaction zone.

7. The process of claim 1, wherein the weight ratio of an amount of the first vapour stream introduced at the first position to an amount of the product stream conducted to the second reaction zone is 1:1000 to 1:5.

8. The process of claim 1, wherein the weight ratio of an amount of the second vapour stream introduced at the second position to an amount of the product stream conducted to the second reaction zone is 1:200 to 1:5.

9. The process of claim 1, wherein the weight ratio of an amount of the first vapour stream introduced at the first position to an amount of the second vapour stream introduced at the second position is 5:1 to 1:5.

10. The process of claim 1, wherein the first vapour stream comprises at least 90 wt. % carbon monoxide.

11. The process of claim 1, wherein the second vapour stream comprises 10-70 wt. % carbon monoxide.

12. The process of claim 1, wherein the carbon monoxide concentration of the first vapour stream is at least 5 wt. % higher than the carbon monoxide concentration of the second vapour stream.

13. The process of claim 1, wherein the second vapour stream further comprises water, acetic acid, and one or more of methanol and reactive derivatives thereof.

14. The process of claim 1, wherein the second vapour stream comprises at least a portion of the off-gas stream including carbon monoxide, water, and acetic acid.

15. The process of claim 1, wherein the effluent of the second reaction zone comprises 70-95 wt. % acetic acid.

16. The process of claim 1, wherein the effluent of the second reaction zone comprises no more than 1 wt. % carbon monoxide.

17. The process of claim 1, comprising separating at least a portion of the effluent of the second reaction zone in a flash separation zone into a vapour stream rich in acetic acid and a liquid stream lean in acetic acid.

18. The process of claim 17, further comprising introducing at least a portion of the liquid stream to the first reaction zone.

19. A system for producing acetic acid, comprising
a first reaction zone having one or more inlets in communication with a source of methanol and a source of carbon monoxide, an off-gas outlet and a product stream outlet;
a second reaction zone having a reaction zone inlet and an outlet, the reaction zone inlet being in fluid communication with the product stream outlet of the first reaction zone, the second reaction zone comprising
a first vapour stream inlet at a first position between the reaction zone inlet and the outlet, the vapour stream inlet being in communication with a source of a first vapour stream rich in carbon monoxide, and
a second vapour stream inlet at a second position between the reaction zone inlet and the outlet, the second vapour stream inlet being in communication with a source of a second vapour stream lean in carbon monoxide;
wherein the first position is between the reaction zone inlet and the second position.

20. The system of claim 19, wherein the distance between the reaction zone inlet and the second position is at least 50% of a distance between the reaction zone inlet and the outlet of the second reaction zone.

21. The system of claim 19, wherein the distance between the inlet and the first position is no more than 25% of a distance between the reaction zone inlet and the outlet of the reaction zone.

22. The process of claim 1, wherein the carbon monoxide concentration of the first vapour stream is at least 15 wt. % higher than the carbon monoxide concentration of the second vapour stream.

* * * * *